May 9, 1939.   G. L. DIMMICK   2,157,166
OPTICAL SYSTEM
Filed Dec. 31, 1936
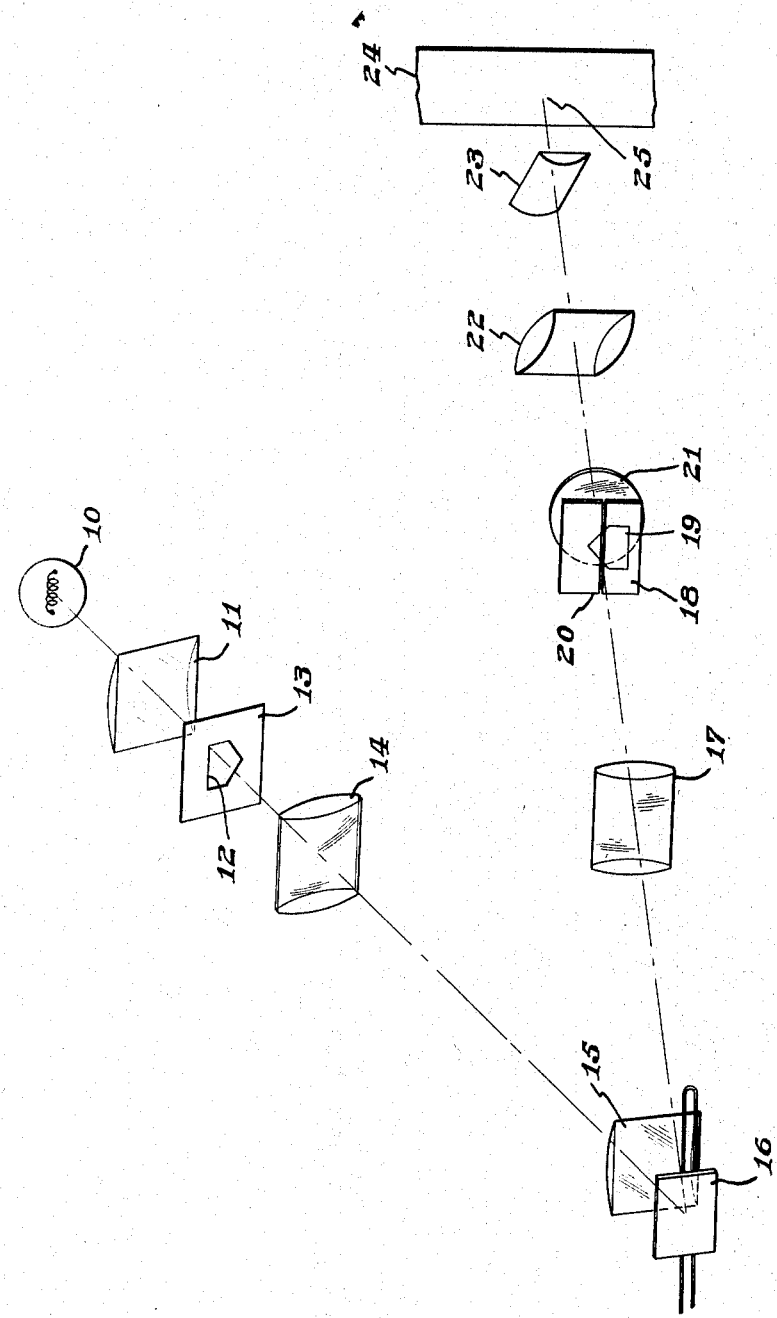
INVENTOR
GLENN L. DIMMICK
BY 
ATTORNEY Patented May 9, 1939

2,157,166

UNITED STATES PATENT OFFICE 2,157,166

OPTICAL SYSTEM

Glenn L. Dimmick, Erlton, N. J., assignor to Radio Corporation of America, a corporation of Delaware Application December 31, 1936, Serial No. 118,429

3 Claims. (Cl. 88—24)

This invention relates to improvements in optical systems and particularly to optical systems of the type used in recording sound on photographic film. The system involves a novel arrangement of cylindrical and spherical lenses for securing the maximum light efficiency in such a recording system.

Recording systems for making variable area sound records are well known in the art and the type thereof wherein a triangular aperture is imaged upon a slit and vibrated transversely across the slit is also known as shown, for example, in my Patent No. 1,999,721, issued April 30, 1935.

The present invention pertains to a somewhat analogous optical system having its various elements arranged along a V-shaped light path with the plane of this path perpendicular to the longitudinal axis of the film and with the one leg of the path perpendicular to the film. The arrangement of lenses herein disclosed, however, is entirely different from that shown in the aforesaid patent and is an improvement thereover in that it is more efficient.

According to this invention, light is directed from an exciter lamp through a condensing lens to a mask of appropriate shape. It then passes through further lenses to a galvanometer which vibrates in accordance with the sound to be recorded, and in an appropriate direction, either vertical or horizontal, depending on the type of mask used.

The vibrating light beam from the galvanometer then passes through additional lenses to a slit where a narrow line of light is transmitted, which in turn is focused upon the film. These several lenses are all positive in power, and most of them are made cylindrical in order that the refracting power of the system, in either the vertical or the horizontal plane, may be made as effective as possible independent of the refracting power required in the plane perpendicular thereto.

By means of this arrangement of cylindrical lenses of proper focal lengths and spacings, it is possible (1) to direct a greater amount of light onto a galvanometer mirror than would otherwise be secured; (2) to produce a narrower line of light upon the film than could be conveniently secured by means of spherical lenses; (3) to reduce the length of the slit required to transmit the beam of light of appropriate shape, and thereby reduce the overall dimensions of the apparatus; and (4) to fix the length of the line of light on the film, and the width thereof, independently of each other.

One object of my invention is to provide such an optical system which decreases the light losses in the system.

Another object of my invention is to provide such a system which uses primarily simple cylindrical lenses insofar as possible.

Another object of my invention is to provide such an optical system which gives an appropriate reduction in image size in each plane.

Another object of my invention is to provide such an optical system which reduces the image of the illuminated slit much more in the longitudinal direction of the film than in the transverse direction of the film.

Another object of my invention is to produce such an optical system which will produce a very great reduction in the image of the optical slit in the direction of movement of the film without requiring an excessive length of the slit transversely of the film in order to secure proper sound-track width.

Other and incidental objects of my invention will be apparent to those skilled in the art from a reading of the following specification and an inspection of the accompanying drawing in which the single figure is a diagrammatic perspective view of my improved optical system.

Referring now to the drawing, the usual exciter lamp of the coil filament incandescent type is provided at 10. Light from the filament passes through the condenser lens 11 which is a plano-cylindrical lens having its axis vertical, i. e., perpendicular to the plane of the V-shaped optical system. This lens condenses light from the lamp 10 in the horizontal plane on to the galvanometer mirror 16, the lens 15 which is also a plano-cylindrical lens with its axis vertical adding very slightly to the condenser action. After passing through the lens 11 the light passes through the aperture 12 in the aperture plate 13 where the shape of the beam is defined and thence to the lens 14. This lens 14 is a double convex cylindrical lens with its axis horizontal and serves to condense the light from the lamp 10 in the vertical plane into the galvanometer mirror 16.

After leaving the galvanometer mirror 16, the light passes again through the lens 15 to the cylindrical lens 17. The lens 17, like the lens 14, is a double convex cylindrical lens with its axis horizontal. The lenses 17 and 14 in cooperation form an image of the aperture 12 in the vertical direction upon the slit plate 18, while the lens 15 which functions in the horizontal plane perpendicular to the plane of operation of the lenses 14 and 17 correspondingly defines the other outlines of the image 19.

Assuming the mirror 16 to be vibrated about a horizontal axis in accordance with the sounds to be recorded, the image 19 will be moved up and down across the aperture plate 18, thereby causing a greater or less portion of the triangular figure to fall on the slit 20 which transmits a correspondingly long or short beam of light. The actuation of the galvanometer is preferably in the manner described in my aforesaid Patent No. 1,999,721. Light from the slit 20 passes through the lens 21. As stated previously, the lenses 11 and 14 form an image of the filament of the lamp 10 in the galvanometer mirror 16 and this lens 21 which is a convex spherical lens forms an image of this filament image in the lens 22. The lens 22 is a double convex cylindrical lens with its axis vertical and forms an image of the slit 20 on the film 24 at the point 25. This lens 22 is so chosen as to focal length that it will reduce the image of the illuminated portion 19 of the slit 20 in the ratio of 3 to 1 laterally of the film. It is, therefore, necessary with standard film using a sound-track .070" wide that the image 19 have a maximum width of only .210" thereby permitting the use of a relatively short slot. The lens 23, however, which is a plano-convex cylindrical lens having its axis horizontal, is made of much shorter focal length than the lens 22 and provides a reduction of preferably 12 to 1 in the slit image in the direction of movement of the film since commercial practice at the present time requires the use of a slit width of from .0005" down to .00025". This permits the use of a slit 20 having a width of 12 times these dimensions which is comparatively simple to construct, whereas a much narrower slit than this becomes extremely difficult of construction.

It will be apparent from the foregoing that the lenses are so chosen as to focal length and arranged in such sequence as to produce an extremely compact optical system of very high efficiency.

Having now described my invention, I claim:

1. An optical system of the class described including in sequence an exciter lamp, a cylindrical lens, a beam defining aperture plate, second and third cylindrical lenses, a galvanometer, a fourth cylindrical lens, a slit plate having a slit therein, a spherical lens and fifth and sixth cylindrical lenses, all arranged along a V-shaped path, the galvanometer being located at the apex of the V, the first and third of said cylindrical lenses having their axes perpendicular to the plane of the V and having the exciter lamp and galvanometer mirror located at their conjugate foci, the second of said cylindrical lenses having its axis in the plane of the V and having the exciter lamp and galvanometer at its conjugate foci in said plane, the fourth of said cylindrical lenses having its axis in the plane of the V and having the said aperture plate and slit plate located at the conjugate foci of the second and fourth lenses perpendicular to said plane and at the conjugate foci of the third of said lenses in said plane, and the fifth and sixth of said lenses having their axes respectively perpendicular to and parallel to said plane and having said slit plate and the final image plane of the optical system at their conjugate foci.

2. An optical system of the class described including in sequence an exciter lamp, a plano-cylindrical lens, a beam defining aperture plate, second double and third plano-cylindrical lenses, a galvanometer, a fourth double cylindrical lens, a slit plate having a slit therein, a spherical lens and fifth and sixth cylindrical lenses, all arranged along a V-shaped path, the galvanometer being located at the apex of the V, the first and third of said cylindrical lenses having their axes perpendicular to the plane of the V and having the exciter lamp and galvanometer mirror located at their conjugate foci, the second of said cylindrical lenses having its axis in the plane of the V and having the exciter lamp and galvanometer at its conjugate foci in said plane, the fourth of said cylindrical lenses having its axis in the plane of the V and having the said aperture plate and slit plate located at the conjugate foci of the second and fourth lenses perpendicular to said plane and at the conjugate foci of the third of said lenses in said plane, and the fifth and sixth of said lenses having their axes respectively perpendicular to and parallel to said plane and having said slit plate and the final image plane of the optical system at their conjugate foci.

3. An optical system of the class described including in sequence an exciter lamp, a plano-cylindrical lens having its cylindrical side toward said lamp, a beam defining aperture plate, second double and third plano-cylindrical lenses, a galvanometer, said third lens having its plano side toward and adjacent to the galvanometer, a fourth double cylindrical lens, a slit plate having a slit therein, a spherical lens and fifth and sixth cylindrical lenses, all arranged along a V-shaped path, the galvanometer being located at the apex of the V, the first and third of said cylindrical lenses having their axes perpendicular to the plane of the V and having the exciter lamp and galvanometer mirror located at their conjugate foci, the second of said cylindrical lenses having its axis in the plane of the V and having the exciter lamp and galvanometer at its conjugate foci in said plane, the fourth of said cylindrical lenses having its axis in the plane of the V and having the said aperture plate and slit plate located at the conjugate foci of the second and fourth lenses perpendicular to said plane and at the conjugate foci of the third of said lenses in said plane, and the fifth and sixth of said lenses having their axes respectively perpendicular to and parallel to said plane and having said slit plate and the final image plane of the optical system at their conjugate foci.

GLENN L. DIMMICK.